United States Patent [19]

Nakamura

[11] Patent Number: 5,002,629

[45] Date of Patent: Mar. 26, 1991

[54] FLOOR COVERING PEELING MOTOR-POWERED VEHICLE

[75] Inventor: Souichi Nakamura, Kyoto, Japan

[73] Assignee: Kabushiki Kaisha Sohken, Osaka, Japan

[21] Appl. No.: 463,495

[22] Filed: Jan. 11, 1990

[51] Int. Cl.[5] .................... B32B 31/18

[52] U.S. Cl. .................... 156/584; 30/170; 156/344; 299/37

[58] Field of Search .................... 30/170; 156/344, 584; 299/36, 37

[56] References Cited

U.S. PATENT DOCUMENTS

| | | | |
|---|---|---|---|
| 3,563,608 | 2/1971 | Crispino | 299/37 |
| 3,779,605 | 12/1973 | Nieman | 299/37 |
| 4,043,601 | 8/1977 | Schiller | 299/36 |
| 4,668,017 | 5/1987 | Peterson et al. | 299/37 |

FOREIGN PATENT DOCUMENTS

| | | |
|---|---|---|
| 62-3484 | 1/1987 | Japan . |

*Primary Examiner*—Robert A. Dawson

[57] ABSTRACT

A floor covering peeling motor-powered vehicle having a peeling blade movable back and forth by means of a thrusting device at a specified angle relative to the floor surface, such that the cutting edge of the peeling blade is advanced into a space between the floor surface and the floor covering under a specified thrust force while the vehicle is in motion, whereby the floor covering can be easily and quickly peeled from the floor surface.

13 Claims, 3 Drawing Sheets

FLOOR COVERING PEELING MOTOR-POWERED VEHICLE

BACKGROUND OF THE INVENTION

1. Field of the Invention

This invention relates to a floor covering peeling motor-powered vehicle and, more particularly, to a floor covering peeling motor-powered vehicle of the type which can automatically peel a plurality of sheets or blocks of floor covering laid on the floor.

2. Description of Background Art

Hitherto, floor covering peeling apparatuses have been known in the art. A typical example of such apparatus is one described in Japanese Utility Model Application Laid-Open Publication No. 59-22859.

This prior-art apparatus, as shown in FIG. 4, includes a body frame 47 having, in its rear portion, a pair of wheels 45, 45 and a push handle 46, and a cutter plate bracket 49 having a cutter plate 48 for peeling floor covering which bracket 49 is mounted to the front end of the body frame 47, the cutter plate 48 being movable back and forth by a driving force from a motor 51 having a downwardly extending motor shaft 50.

SUMMARY OF THE INVENTION

The prior art floor covering peeling apparatus disclosed has a disadvantage such that since the push handle 46 is manually held in and used for pushing the apparatus forward while causing the cutter plate 48 to sequentially peel blocks of the floor covering, the thrust force available for forward movement is insufficient if the floor covering is of a heavy duty construction or if it is in strong bond with the floor, in which case considerable effort is required of the operator. Sometimes, therefore, the apparatus has been found to be incapable of peeling the floor covering or not efficiently operable requiring too much time in performing the required peeling work.

This invention is directed to overcoming the problems with the prior art apparatus, and accordingly the object of the invention is to provide a floor covering peeling motor-powered vehicle which can easily and quickly peel blocks of floor covering laid on the floor and which is easy to operate.

In order to accomplish the above objective, according to the invention there is provided a floor covering peeling motor-powered vehicle comprising a vehicle body 20 equipped with a movable rolling member, a prime mover unit 1 for driving the rolling member, an operator's seat 16, a peeling blade 35 disposed at the forward side of the vehicle body 20 for peeling floor covering, and thrusting means for moving a cutting edge 36 of the peeling blade 35 forward and backward at an oblique angle relative to the floor surface.

With a floor covering peeling motor-powered vehicle of the above construction, when the operator is seated on the operator's seat 16 to drive the vehicle body 20, the cutting edge 36 of the peeling blade 35 is moved back and forth by the thrusting means over a predetermined angle of inclination relative to the floor surface so that the cutting edge 36 is sequentially inserted between the floor surface and blocks of the floor covering as it moves back and forth, with the result that individual blocks of the floor covering are smoothly turned up so that they are peeled from the floor surface.

As stated above, the vehicle body is equipped with a peeling blade movable back and forth at the predetermined angle of inclination relative to the floor surface under the action of the thrusting means and, therefore, when the operator, as seated on the operator's seat, drives the vehicle body into movement, the cutting edge of the peeling blade advances into a space between the floor surface and the floor covering under a certain thrusting force while moving forward and backward, so that blocks of the floor covering are smoothly turned up.

Since the floor covering peeling motor-powered vehicle in accordance with the invention is self-movable, it involves no such inconvenience that the floor covering cannot be peeled from the floor depending upon its thickness or the condition of its bond with the floor as often experienced when a conventional floor covering peeling apparatus is employed, and provides good advantage over the prior art apparatus in that it permits a very easy and efficient peeling operation.

DETAILED DESCRIPTION OF THE PREFERRED EMBODIMENTS

One embodiment of the invention will now be described with reference to the accompanying drawings.

Figure 1:
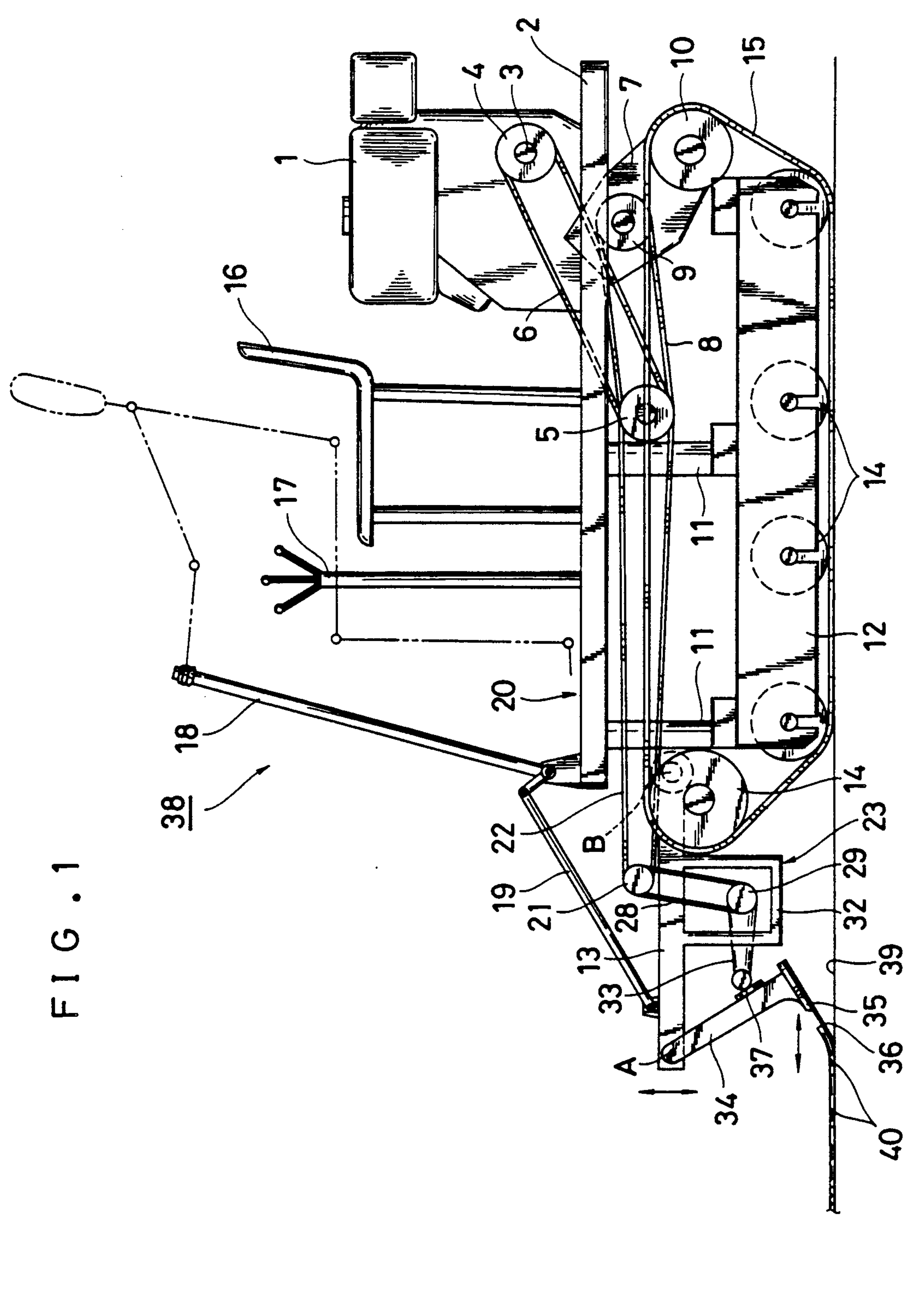
FIGS. 1 and 2 illustrate one embodiment of the invention, FIG. 1 being a front view of a floor covering peeling motor-powered vehicle representing the embodiment, FIG. 2 being a transverse sectional view showing an eccentric crank oscillator assembly.

In FIG. 1, numeral 1 generally designates a prime mover unit consisting of a gasoline engine mounted on a rear end portion of a base plate 2. An output shaft 3 extends laterally (toward the foreground side in FIG. 1) from one side of the prime mover unit 1, a first pulley 4 being fitted on the output shaft 3. A second pulley 5 is rotatably mounted in position adjacent a generally median portion of the base plate 2 at one side thereof and has three parallel grooves formed on the outer periphery thereof. A first groove of the second pulley 5 is engaged by a belt 6 trained about the first and second pulleys 4, 5. A pair of downwardly inclined transmission blocks 7 are provided at opposite sides of the rear end portion of the base plate 2. On one of the transmission blocks 7 at an upper outer side portion thereof is rotatably mounted a third pulley 9 which is associated through a belt 8 with a second groove of the second pulley 5. Elevated wheels 10 movable in cooperation with the third pulley 9 are rotatably mounted on respective outer side lower portions of the transmission blocks 7.

Vertical frames 11 extend downwardly from the underside of the base plate 2 at median and front end portions thereof and are connected at their lower ends to a horizontally extending bottom frame 12. A front frame 13 extends forwardly from a median portion of the front side vertical frame 11 through a support shaft B. Wheels 14 are rotatably supported as a pair at the rear end of the underside of the front frame 13 and in four pairs at opposite sides of the bottom frame 12. A rubber-made track and tread device 15 is trained over these wheels 14 and the elevated wheels 10 rotatably mounted on the transmission blocks 7.

An operator's seat 16 is provided centrally on the top of the base plate 2, and an operating control lever 17 is provided upright adjacent the front side of the operator's seat 16. Shown by 18 is a pressure regulating lever extending obliquely upward from the front end of the base plate 2 at one side thereof, which is adapted to move the front end of the front frame 13 upward and downward via a connecting rod 19.

The vehicle body 20 is constructed as above described.

Figure 2:
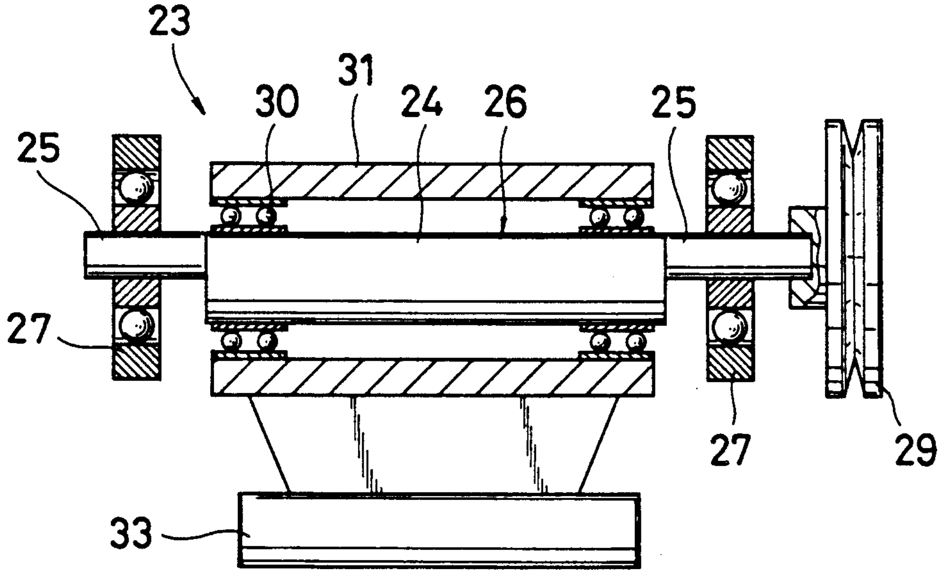
Figure 4:
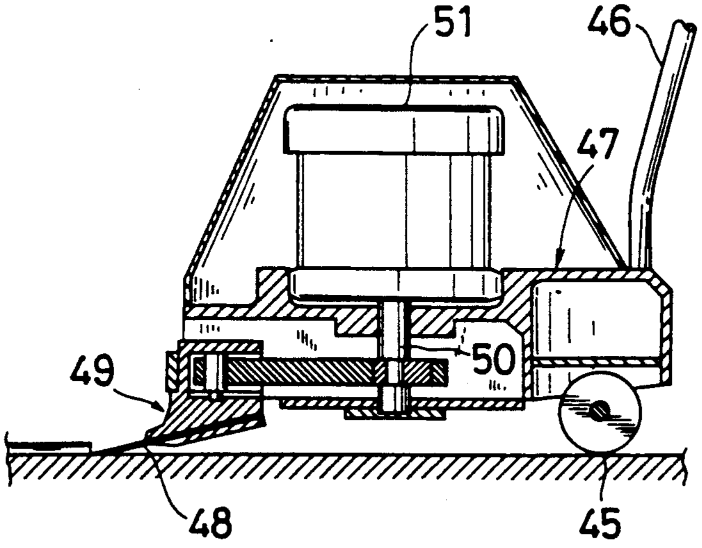
FIG. 4 (Prior Art)
FIG. 4 is a front view partly in section showing a conventional arrangement.

Centrally on the front frame 13 at one side thereof is rotatably mounted a fourth pulley 21 having two lines of grooves, a first one of which grooves is associated with a third groove of the second pulley 5 through a belt 22 trained about the pulleys 21 and 5. A crank oscillation mechanism 23 is disposed centrally on the underside of the front frame 13. As FIG. 2 shows, the crank oscillation mechanism 23 comprises a shaft portion 26 having its body 24 eccentrically connected to its end portions, the shaft portion 26 being rotatably supported in bearings 27. On one end of the shaft portion 26 is rotatably mounted a fifth pulley 26 which is associated with a second groove of the fourth pulley 21 through a belt 28. A cylindrical member 31 is fitted on the body portion 24 of the shaft portion 26 through rollers 30. A push element 33 extends from the outer periphery of the cylindrical member 31 passing through a housing 32 of the oscillation mechanism 23, the push element 33 being guided for reciprocal movement in longitudnal directions. The push element 33 has a protrusion formed at the front end thereof. On a support shaft A at the front end of the front frame 13 is rotatably mounted a blade mounting arm 34 which is slanted toward the vehicle body 20, two peeling blades 35 projecting downwardly from the lower end of the blade mounting arm 34, with respective cutting edges 36 of the blades 35 directed downward at a specified angle of inclination. The blade mounting arm 34 is formed on its rear side with a pad 37 subject to a striking force of the front end of the push element 33.

The construction of the floor covering peeling motor-powered vehicle of the present embodiment having been described, explanation will be made of the manner of operation of the vehicle 38 in peeling a plurality of blocks of floor covering 40, such as plastic tiles, laid on a floor surface 39.

The operator, when seated on the operator's seat 16, manipulates the operation control lever 17 to drive the prime mover unit 1 to thereby rotate the first pulley 4.

Thereupon, the second and third pulleys 5, 9 go into rotation through the belts 6, 8 and simultaneously the wheels 10 rotatably mounted on the transmission block 7 are rotated so that the track and tread device 15 is driven to move the vehicle 38 forward. Simultaneously, the rotation of the second pulley 5 is transmitted to the fourth and fifth pulleys 21, 29 through the belts 22, 28 to rotate the shaft portion 26 within the eccentric crank oscillation mechanism 23.

Since the body portion 24 of the shaft portion 26 is eccentrically formed, the cylindrical member 31 fitted on the body portion 24 through the rollers 30 causes the push element 33 to move reciprocally in longitudinal directions so that the push element 33 strikes at its front end continually against the pad 37 of the blade mounting arm 34.

As a consequence of such continual striking action of the push element 33 against the blade mounting arm 34 which is rotatably mounted to the front end of the front frame 13 at a slant toward the vehicle body 29, the blade mounting arm 34 is intermittently pushed toward the direction of vehicle movement via the support shaft A about which it turns, so that the cutting edge 36 of the peeling blade 35 mounted to the lower end of the arm 34 is oscillated over an acute angle relative to the floor covering 40 as it is held in abutment against the floor covering 40. Thus, the cutting edge 36 of the peeling blade 35 strikes on an edge portion of the floor covering 40 for entry into a bond interface between the floor covering 40 and the floor surface 39, whereupon the cutting edge 36 moves back and forth while being pressed forward by the forward thrust force of the vehicle 38 and striking action of the push element 33 and is inserted deeply into a space between the floor covering 40 and the floor surface 39 while being held in close contact with the floor surface 39. Hence, the floor covering 40 can be smoothly and accurately turned up and thus peeled from the floor surface.

In this way, the operator seated on the operator's seat 16 of the vehicle 38 is only required to manipulate the control lever 17 and a plurality of blocks of floor covering 40 can be easily and accurately peeled from the floor surface by the action of the vehicle 38 moving with the specified degree of thrust force.

Since the floor covering peeling motor-powered vehicle of the present embodiment has a pressure regulating lever 18, the front end side of the front frame 13 is liftable and lowerable to a certain extent. That is, when the pressure regulating lever 18 is pulled toward the operator, the front end side of the front frame 13 is slightly lifted, and when the lever 18 is pushed forward, the front end side of the front frame 13 is lowered. Through such control of the pressure regulating lever 18 is it possible to adjust the angle of advance, advancing force, and contacting power of the peeling blade 35 of the blade mounting arm 34 rotatably mounted on the front frame 13 can be adjusted in relation to the floor covering 40 and/or to the floor surface. Thus, peeling operation with respect to blocks of floor covering can be performed more satisfactorily by controlling the pressure regulating lever 18 according to the thickness of the floor covering and the condition of its bond with the floor.

During the peeling operation, the peeling blade 35 may be subject to resistance from the floor covering 40, but in this embodiment a rubber-made caterpiller 15 is employed as moving means for the vehicle. This makes the vehicle 38 less likely to slip and permits the peeling operation to be performed more accurately, and eliminates possible cause of such inconvenience that the track of the caterpillar 15 is left on the floor surface 39 from which the floor covering material has been removed, thereby affecting the appearance of the floor.

In the above described embodiment, the thrust means for moving the cutting edge 36 of the peeling blade 35 includes an eccentric crank oscillation mechanism utilizing an eccentric shaft, and a push element 33 which strikes against the blade mounting arm 34, but this invention is not limited by such an arrangement. An eccentric cam or a slider crank mechanism may be employed instead of the eccentric shaft. It is also possible to use an arrangement such as that shown in FIG. 3, in which a hydraulic pump 41 having a main shaft rotatable under the drive force of the prime mover unit 1 is employed in conjunction with hydraulic hoses 42 and a hydraulic motor 43, for the purpose of moving the cutting edge 36 of the peeling blade 35 forward and backward. There is no particular limitation with respect to the arrangement of such thrust means.

In the foregoing embodiment, the track and tread device is employed as rotating means for moving the vehicle 29, but the invention is not limited to such form of rotating means. For example, tires may be employed instead of the track and tread device.

Further, it is to be understood that the prime mover unit 1 for driving the rotating means is not limited to a gasoline engine as employed in the above embodiment. An electric motor or the like may be used instead of the gasoline engine.

The peeling blade 35 is not necessarily of the type as used in the embodiment in which the blade 35 consists of two blades connected together. For example, the blade 35 may be a single blade. There is no particular limitation with respect to the blade arrangement.

In the embodiment, the peeling blade 35 is movable back and forth in conjunction with the movement of the vehicle body 29, but the invention is by no means limited by such an arrangement. Of course it is possible to arrange the vehicle body 29 and the peeling blade 35 to be movable independently of each other.

In the above described embodiment, the pressure regulating lever 18 is provided to enable angular adjustment of the cutting edge 36 of the peeling blade 35 relative to the floor surface through the connecting rod 19 and front end frame 13. This arrangement provides an advantage such that the peeling operation with respect to floor covering 40 can be satisfactorily performed through the control of the pressure regulating lever 18 according to the bond condition of the floor covering, but the cutting edge 36 need not be arranged to be angularly adjustable.

Figure 3:
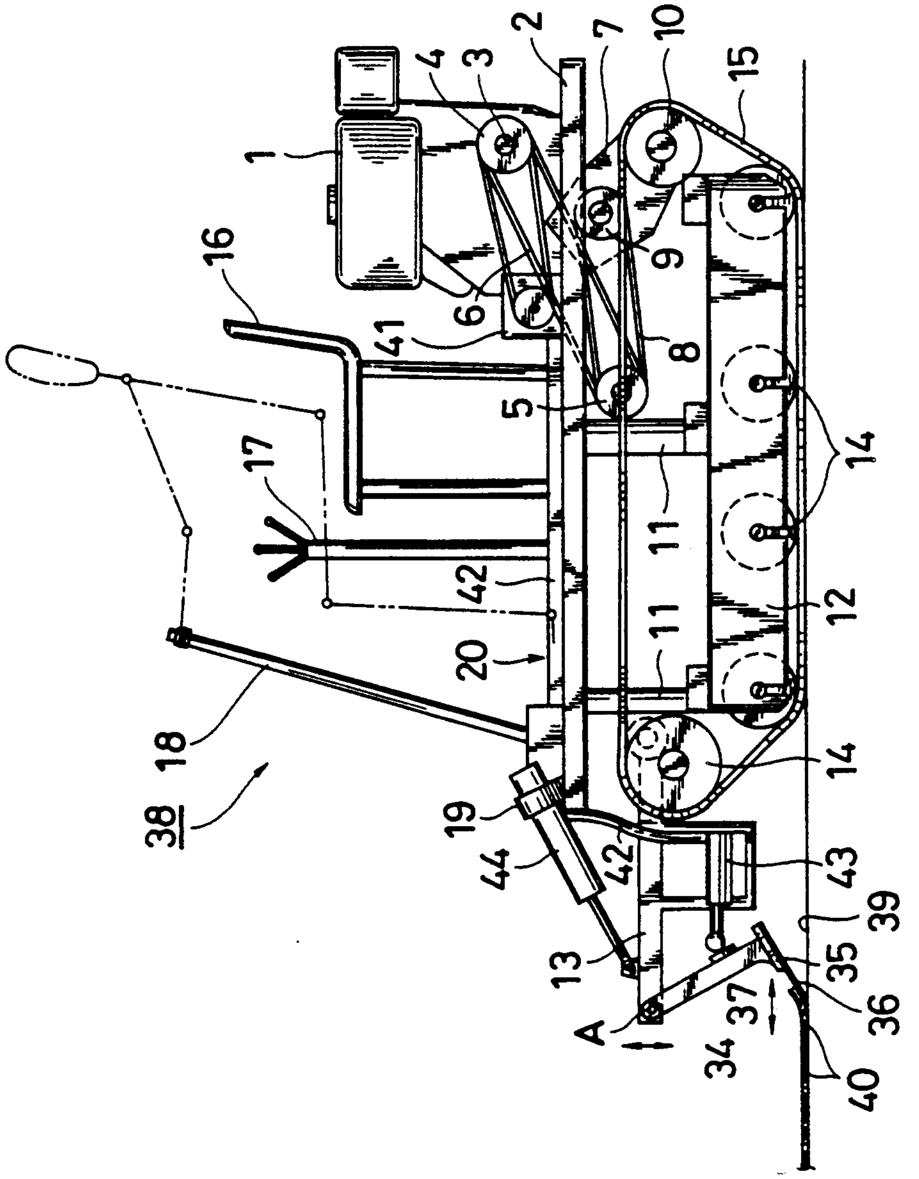
FIG. 3 is a front view of a floor covering peeling motor-powered vehicle representing another embodiment of the invention.

For angular adjustment of the cutting edge 36 of the peeling blade 35 relative to the floor surface, a hydraulic cylinder 44 operable by means of above mentioned hydraulic pump 41, as shown in FIG. 3, may be employed in place of the manual means used in the foregoing embodiment.

Other details of the invention, such as configuration of the vehicle body 29, may be varied, altered, or modified in design as desired within the claimed scope of the invention.

This invention is applicable for use in connection with a peeling operation for a wide range of flooring materials including continuous plastic sheeting and cushion sheeting, in addition to the plastic style floor covering material as shown by way of example in the embodiments described.

What is claimed is:

1. A floor covering peeling motor-powered vehicle comprising:

- a vehicle body equipped with a movable rolling member;
- a prime mover unit for driving the rolling member;
- an operator's seat;
- a peeling blade mounted on a blade mounting arm disposed at the forward side of the vehicle body for peeling floor covering; and
- removably engageable thrusting means for pivotably moving a cutting edge of the peeling blade forward and backward at an oblique angle relative to the floor surface.

2. A floor covering peeling motor-powered vehicle as set forth in claim 1, wherein said thrusting means includes an eccentric crank oscillation mechanism and a push element removably engageable with a portion of the blade mounting arm.

3. A floor covering peeling motor-powered vehicle as set forth in claim 1, wherein said thrusting means is a hydraulic motor.

4. A floor covering peeling motor-powered vehicle as set forth in claim 1, wherein said movable rolling member is propelled on a track and tread arrangement.

5. A floor covering peeling motor-powered vehicle as set forth in claim 1, wherein the cutting edge of said peeling blade is angularly adjustable relative to the floor surface.

6. A floor covering peeling device for a motor powered vehicle comprising:

- a front mounting frame pivotably connected to a front end of said motor powered vehicle, said frame being mounted a predetermined distance above a floor surface;
- a blade mounting arm pivotably connected to a front end of said front mounting frame;
- a peeling blade fixed to a distal end of said blade mounting arm and insertable between a floor surface and a floor covering;
- a push element removably engageable with a portion of said blade mounting arm for repeatedly pushing said blade mounting arm in a forward direction thereby repeatedly forcing said peeling blade between the floor surface and floor covering;
- means for repetitively oscillating said push element against said blade mounting arm, said means for oscillating being mechanically linked to a prime mover said of said motor powered vehicle;
- wherein repetitive striking of said push element against said blade mounting arm enables said blade mounting arm to pivot about the front end of said front mounting frame thereby moving said peeling blade through an arcuate path and at a predetermined angle between the floor surface and floor covering for separation thereof.

7. The floor covering peeling device according to claim 6, further including a pressure regulating lever for moving the front end of said front frame member upward and downward thereby adjusting pressure of said peeling blade against the floor surface.

8. The floor covering peeling device according to claim 6, wherein movement of said motor powered vehicle in a forward direction pivots said blade mounting arm toward said push element for a floor covering peeling operation.

9. The floor covering peeling device according to claim 6, wherein said means for repetitively oscillating includes an eccentric body portion housed within a rotatable pulley member and engaged with said push member, wherein rotation of the pulley member by the prime mover rotates said eccentric body portion into cyclical engagement with said push member.

10. The floor covering peeling device according to claim 6, wherein said means for repetitively oscillating includes a hydraulically actuated thrusting element.

11. The floor covering peeling device according to claim 7, wherein movement of said motor powered vehicle in a forward direction pivots said blade mounting arm toward said push element for a floor covering peeling operation.

12. The floor covering peeling device according to claim 7, wherein said means for repetitively oscillating includes an eccentric body portion housed within a rotatable pulley member and engaged with said push member, wherein rotation of the pulley member by the prime mover rotates said eccentric body portion into cyclical engagement with said push member.

13. The floor covering peeling device according to claim 7, wherein said means for repetitively oscillating includes a hydraulically actuated thrusting element.

* * * * *